(12) United States Patent
Dimitrov et al.

(10) Patent No.: US 9,563,305 B2
(45) Date of Patent: Feb. 7, 2017

(54) ELECTRONIC DISPLAY WITH PUSH BUTTONS

(71) Applicant: Casino Technology AD, Sofia (BG)

(72) Inventors: Dimityr Dimitrov, Sofia (BG); George Spasov, Sofia (BG)

(73) Assignee: Casino Technology AD, Sofia (BG)

( * ) Notice: Subject to any disclaimer, the term of this patent is extended or adjusted under 35 U.S.C. 154(b) by 472 days.

(21) Appl. No.: 13/936,975

(22) Filed: Jul. 8, 2013

(65) Prior Publication Data

US 2014/0160028 A1    Jun. 12, 2014

Related U.S. Application Data

(63) Continuation of application No. 12/221,565, filed on Aug. 4, 2008, now Pat. No. 8,488,069.

(51) Int. Cl.
| | |
|---|---|
| *H04N 5/33* | (2006.01) |
| *G06F 3/02* | (2006.01) |
| *G09G 5/00* | (2006.01) |
| *G06F 3/041* | (2006.01) |
| *G06F 3/0354* | (2013.01) |
| *G06F 3/046* | (2006.01) |

(52) U.S. Cl.
CPC ........... *G06F 3/0416* (2013.01); *G06F 3/0202* (2013.01); *G06F 3/0219* (2013.01); *G06F 3/03547* (2013.01); *G06F 3/046* (2013.01)

(58) Field of Classification Search
None
See application file for complete search history.

(56) References Cited

U.S. PATENT DOCUMENTS

| | | | |
|---|---|---|---|
| 4,987,279 | A | 1/1991 | Hirose et al. |
| 5,703,625 | A | 12/1997 | Snider et al. |
| 7,060,922 | B2 | 6/2006 | Hoehne et al. |
| 7,184,032 | B2 | 2/2007 | Stohrer et al. |
| 7,352,355 | B2 | 4/2008 | Troxell et al. |
| 7,907,121 | B2 | 3/2011 | Jacobs et al. |
| 2006/0284874 | A1 | 12/2006 | Wilson |
| 2007/0013662 | A1 | 1/2007 | Fauth |
| 2007/0060291 | A1 | 3/2007 | Cole et al. |
| 2007/0060352 | A1 | 3/2007 | Cole |
| 2007/0194926 | A1 | 8/2007 | Bayley et al. |
| 2010/0026635 | A1 | 2/2010 | Dimitrov et al. |

*Primary Examiner* — Geepy Pe
(74) *Attorney, Agent, or Firm* — Weide & Miller, Ltd.

(57) ABSTRACT

One or more buttons are associated with an electronic display screen. The display screen is configured to display various information, such as button labels. The buttons are configured, such as by being at least partially transparent, so that the display is visible there through. Input to or activation of the buttons is determined passively, such as by a RF board located at an opposing side of the display screen from the button(s), the board configured to transmit and receive radio frequency signals, and an interface configured to provide a data connection to an electronic device. In this embodiment, the one or more buttons comprise one or more RF transponders.

14 Claims, 4 Drawing Sheets

ELECTRONIC DISPLAY WITH PUSH BUTTONS

BACKGROUND OF THE INVENTION

1. Field of the Invention

The invention relates to a display screen with push buttons.

2. Related Art

Various ways of accepting user input for electronic devices, including gaming machines, have been devised. One common input device is a push-button. The push-button generally has a plunger which may be depressed to activate an electrical switch. These buttons are generally permanently labeled, such as with printing, so as to be easily identified by a user. However, a significant problem with buttons is that they are generally single function. In particular, a separate button must be provided for each function or input. If there are many functions or inputs, this requires many buttons. In addition, once a particular device is configured with buttons, it is difficult to change the configuration of the device, since the number of buttons required and/or their labeling will generally no longer be accurate. Thus, devices which utilize buttons must generally be custom-configured. As one example, a gaming machine could be configured to execute game software to present different games. However, those different games may require different inputs. For example, a "slot" game might include "spin" buttons, while a "poker" game might require "hold/draw" buttons. As such, two different machines must be produced, each with separate numbers of differently labeled buttons.

As an alternative to buttons, some devices utilize touch screens that can display information as well as collect user input. A substantial problem with touch screens, however, is that users often find them difficult to use. First, because touch screens appear similar to non-touch screens, a user may first not even be aware that input is to be provided to a device via the screen. Even so, touch screens lack tactile feedback. Thus, a user may touch an area of the screen and be unsure whether the input was received. This may cause the user to re-touch the screen or believe that the screen is not a touch screen.

An improved input configuration is desired.

SUMMARY OF THE INVENTION

The invention is an interactive display and electronically labeled push-buttons, comprising a combination of one or more buttons and a display.

In one embodiment, the interactive display comprises a display screen configured to display various information, preferably including one or more button labels and one or more buttons associated with the display screen. In a preferred embodiment, input to or activation of the buttons is determined passively, such as by a RF board located at an opposing side of the display screen from the button(s), the board configured to transmit and receive radio frequency signals, and an interface configured to provide a data connection to an electronic device. In this embodiment, the one or more buttons comprise one or more RF transponders. The RF transponders transmit, to the RF board, button state information based on one or more button states of the one or more buttons.

In a preferred embodiment, the buttons are associated with the electronic display so that information displayed by the display is displayed in association with the buttons. Preferably, the buttons include at least one transparent portion which allows the one or more labels or other information displayed by the electronic display to be visible there through.

Preferably, the buttons are push-type buttons which provide tactile feedback of their actuation. In one or more embodiments, the one or more buttons may comprise a plunger comprising a user engageable portion and one or more magnets, and a casing configured to surround the plunger. The casing may comprise one or more Hall effect sensors configured to detect the one or more button states of the one or more buttons. It is noted that the plunger, the casing, or both may be transparent, and that the one or more buttons may be removably attached.

The RF transponders may be configured in various ways. For example, the one or more RF transponders may be configured such that they are powered by the radio frequency signals transmitted by the RF board. In addition, the one or more RF transponders may be configured to transmit button identification information or button authentication information.

It is contemplated that one or more other buttons powered by the radio frequency signals transmitted by the RF board may be provided as well. These one or more other buttons may be attached to the electronic device (rather than the display screen) and configured to transmit button state information to the RF board.

One or more opaque overlays may be located above the display screen and be configured to at least partially surround the one or more buttons. The overlay may screen from view one or more portions of the display, such as those portions with which a button is not associated.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Generally, the invention is a display screen having one or more user actuatable buttons associated therewith. Preferably, the buttons are labeled or identified by information displayed by the display screen. In a preferred embodiment, the buttons are not standard direct switch-activating pushbuttons. Instead, the buttons provide tactile feedback of use and are configured to passively generate an output and/or generate an output without the use of wires or other links which would interfere with the viewing of the display screen.

The invention may be used with an electronic device and is interactive in that it may be used to simultaneously display output on its screen and to accept or collect user input. It is specifically contemplated that the invention may be used with electronic devices such as ATMs, kiosks, and gaming machines. However, it is noted that any electronic device may utilize the invention to display information, collect user input, or both.

Figure 1:
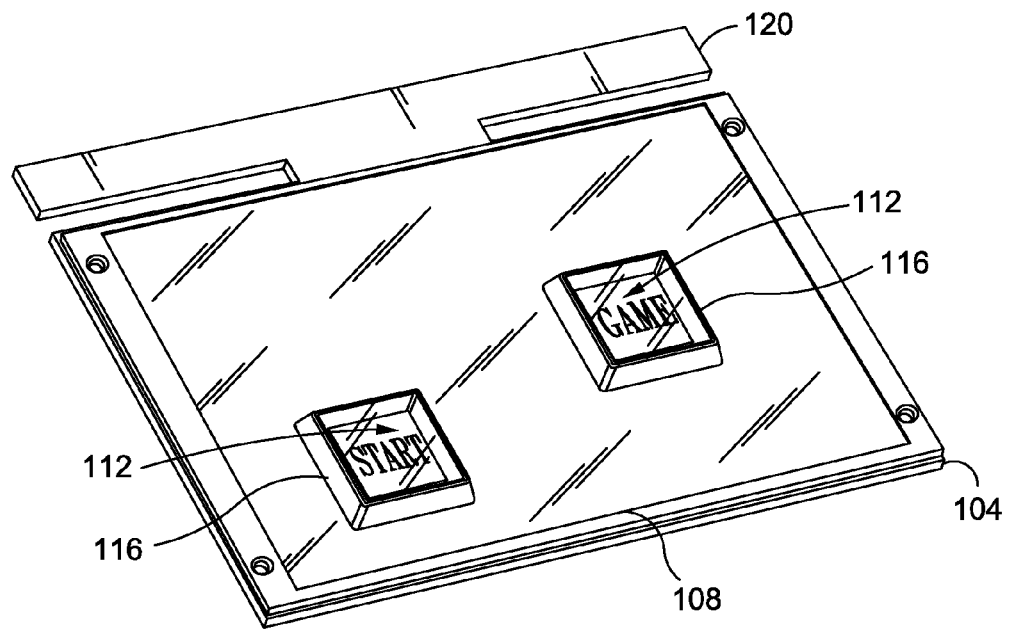
FIG. 1 is a perspective view of an embodiment of the invention.

As illustrated in FIG. 1, the invention may comprise a display screen 108 having one or more buttons 116 associated therewith. The display screen 108 may have a variety of configurations. Preferably, the display screen 108 is an electronic display configured to display images, text or the like. In one embodiment, the display screen 108 is a generally thin, flat panel display such as an LCD, plasma or LED display. However, the display 108 could be of a variety of other types now known or later developed.

Preferably, the button 116 is a physical object, such as a push button, and not a representation of a button or other non-physical object, such as an image of a button displayed on a screen. In this manner, the button 116 preferably comprises a physical object which can be actuated by a user, and which provides tactile feedback.

In a preferred embodiment of the invention, means are provided for passively detecting the state of the button and/or actuation of the button 116, whereby an input or actuation of the button by a user results in at least one output. The output may comprise, for example, a signal.

In this regard, in a preferred embodiment a RF board 104 is used to detect when the one or more of the buttons 116 are pressed or activated. The RF board 104 may be attached behind the display screen 108. In one embodiment, the RF board 104 is configured to detect actuation of one or more buttons 116, and comprises an interface 120 which allows one or more physical connections to be made with an electronic device. This connection allows data as well as power to flow between the electronic device and the invention in one or more embodiments.

For example, power or data may be sent to the invention through one or more electrical connections on the interface 120. The data received through the interface 120 will primarily comprise information to be displayed on the screen 108. However, other information such as, but not limited to, control signals or settings may be received as well. In addition, output from the invention such as button states (e.g. pressed or unpressed), control signals, settings, or other information may be sent through the interface 120 to the electronic device.

It is contemplated that the interface 120 may comprise one or more data or power connections now known or later developed. For example, the interface 120 may include USB, RS232, IEEE 1394, optical, HDMI, VGA, Ethernet, component or composite video, or other connections. Of course, the interface 120 may also comprise one or more proprietary data or power connections if desired. In one embodiment, data may be transmitted, received, or both wirelessly.

In one or more embodiments, the one or more buttons 116 are associated with the display screen 108 so that they are located over at least a portion of the screen. In a preferred embodiment, at least a portion of the display screen 108 is visible through each button 116. In this regard, the buttons 116 may have a variety of configurations, as detailed below. In general, in one embodiment, all or a portion of the button 116 may be transparent or substantially transparent so that the display screen 108 is visible there through. In other embodiments, the buttons 116 might have one or more openings therein through which the display screen 116 may be visible.

As detailed below, in this configuration, the display screen 108 may be used to "label" the buttons 116. In particular, as illustrated in FIG. 1, a label 112, such as having the form of text, static or moving images or the like, may be associated with each button 116 as a result of the button 116 overlying a portion of the display screen 108. This text or other information may be used to label the button 116, so as to identify a particular application for the button to a user.

One advantage of this configuration is that each button 116 can be easily labeled and the labels 112 or other information associated with each button can be easily changed by changing what is displayed under the button by the display screen 108. In one or more embodiments, labeling of buttons 116 may occur electronically, such as by inputting text or graphics, without requiring any physical modification of the invention or its associated electronic device. Traditional methods typically require that a button be removed from its housing so that its label can be changed. In addition, some traditional buttons may have permanent labels thus requiring the entire button to be replaced.

Another advantage is that the labels 112 can be dynamic. For example, the labels 112 may flash various colors or include animated elements. In addition, the labels 112 may change in response to a button 116 being pressed or released. For example, a label 112 may brighten or change color when its associated button 116 is pressed.

Further, the labels 112, and thus the buttons 116 according to the invention, may display more information that a traditional button of similar or even larger size because the buttons are labeled by the underlying display screen 108. Thus, as stated, labels 112 may be animated such as a scrolling or ticker-like display. In this manner, the button 116 may be labeled with more than a few characters despite its size. For example, the button 116 may have a scrolling label 112 comprising multiple characters, one or more words, a sentence, or more. This is advantageous in that the button's 116 function may be fully detailed to users rather than in one or two words as is typical in traditional buttons.

In a preferred embodiment, the label 112 is visible by the user through the button 116. For example, a center section (such as a plunger portion, as detailed below) of the button 116 may be transparent and the label may be displayed in that corresponding area, so that the center or main portion of the button appears labeled to the user. In other embodiments, the label 112 might be displayed adjacent the button.

It is contemplated that the buttons 116 may be associated with the display screen 108 in various manners. In one embodiment, the buttons 116 may be connected or detachably connected to a top surface of the display screen 108. In other embodiments, the buttons 116 might be mounted to another element (such as a clear plate, as detailed below)

which is mounted to or over the display screen 108. In general, it is preferred that the buttons 116 be mounted over/above the display screen 108 in close proximity thereto, so that the display screen 108 and buttons 116 are in close visibility, as detailed above.

The buttons 116 may be directly mounted to the display screen 108 in various manners, and the position or location of the buttons 116 may be changeable. For example, the buttons 116 may be attached by permanent adhesive or fasteners. The buttons 116 may also be removably attached such as by one or more magnets, suction cups, or the like, or adhesive. It is contemplated that in removably attached embodiments, a user or the machine operator may be permitted to move a button 116 such that it is more conveniently positioned or as part of a game or other software running on the electronic device. Preferably, buttons 116 are attached to the display screen 108 without piercing or otherwise physically modifying the screen.

As indicated, the buttons 116 may also be mounted or associated with another element which is in turn associated with the display screen 108 (i.e. an "indirect" mounting). For example, in one embodiment, a transparent overlay (not shown) having one or more buttons 116 attached thereto may be placed over the display screen 108. The overlay may be attached to a structure of the electronic device or of the invention and thus does not have to be directly secured to the display screen 108. This is advantageous in that the overlay may be secured by one or more screws (or the like) and thus be easily replaceable. In addition, various overlays having buttons 116 in different positions may be used to reconfigure the invention as desired.

Preferably, means are provided for detecting activation of the button 116 by a user. As indicated, in one embodiment, the buttons passively or indirectly provide an output. For example, means may be provided for wirelessly detecting when one or more buttons 116 are pressed or activated. This allows the buttons 116 to be positioned and attached anywhere on a display screen 108 without running wires through or around the screen. This is advantageous because the buttons 116 may be repositioned on the screen 108 without modification to the housing or electrical components of the electronic device. In a preferred embodiment, an RF board 104 is used to wirelessly detect when the one or more buttons 116 are pressed or activated, regardless of their physical location on the display screen 108.

The RF board 104 may comprise one or more antenna to transmit and receive radio frequency energy or signals. It is contemplated that any radio frequency technology capable of detecting when one or more buttons are pressed may be used. For example, the RF board 104 may utilize RFID technology. It is also contemplated that radio frequency energy emitted from the RF board 104 may be used to power or energize one or more buttons 116 of the invention.

As stated, the RF board 104 may be used to detect when individual buttons 116 are pressed or otherwise interacted with. In one or more embodiments, the RF board 104 emits radio frequency energy which powers or energizes a RF transponder in each button 116 which then emits a signal indicating the state of the button. In these embodiments, the RF transponder is a passive RF transponder in that it receives power wirelessly through radio frequency energy. Wireless power transmission will typically occur by induction such as used in electrical transformers or RFID technology. Of course, it is contemplated that any wireless power transmission technique, now known or later developed may be used with the invention.

It is noted that some embodiments of the invention may utilize a self-powered RF transponder such as a battery powered RF transponder. Thus, in these embodiments wireless power transmission is not required. Self-powered RF transponders may be advantageous in embodiments where the button requires an amount of power not easily delivered by wireless transmission. For example, a button may have its own processor, lights, one or more speakers, a display, light sensors, proximity sensors, or a combination thereof that are powered by a battery.

Figure 5:
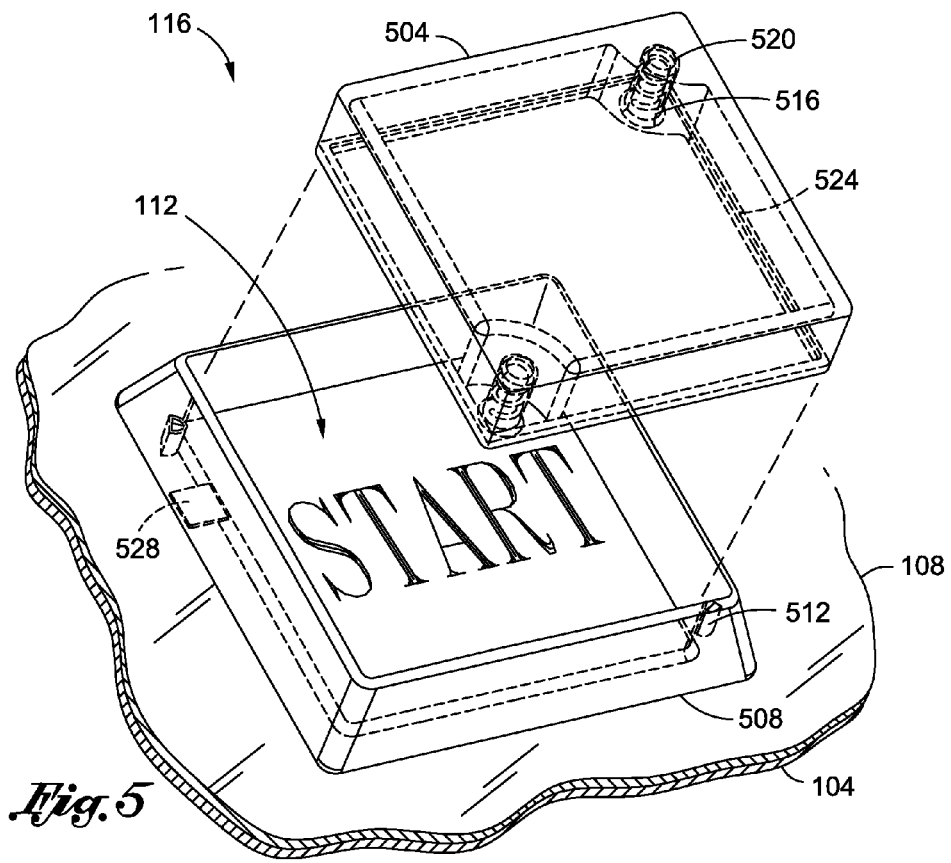
FIG. 5 is an exploded perspective view of a button according to an embodiment of the invention.

FIG. 5 illustrates an exploded view of an exemplary embodiment of a button 116 according to the invention. As shown, the button 116 is located at the top of the display screen 108. A RF board 104 is located beneath the display screen 108. In this manner, the button's 116 RF transponder 528 is located within close proximity to the RF board 104. This is advantageous in that the RF board 104 may wirelessly power the transponder 528 and receive signals from the transponder with a relatively low power radio frequency signal.

As stated, the RF transponder 528 emits a signal corresponding to a button's 116 state when energized by the RF board 104. As used herein, a button state represents the position or other characteristic of a particular button 116. For example, a button 116 may be in a pressed state or may be in an unpressed state. In addition, a button 116 may be in between its pressed and unpressed state, such as for example, when a button has not been fully depressed by a user. Other button states may exist as well.

The RF transponder 528 may determine a button's state in various ways. The embodiment shown in FIG. 5 utilizes Hall effect sensors 512 and a magnetic ring 524 to determine whether the button 116 is pressed or unpressed. As is known in the art, the Hall effect sensors 512 detect changes in voltage as a result of the magnetic field generated by the magnetic ring 524. Thus, as the position of the magnetic ring 524 changes (because the button is pressed, unpressed, or being pressed), the Hall effect sensors 512 detect a voltage change which represents the state of the button 116.

The state of a button 116, as may be referred to herein as button state information, may then be transmitted by its RF transponder 528. It is contemplated that the transponder 528 may transmit button state information comprising voltage readings or may interpret voltage readings and transmit the button's 116 actual state (e.g. pressed, unpressed, or being pressed) or other output or signal, depending on the embodiment. If voltage readings are transmitted, the RF board 104 (or a processor or other circuit of the invention or the electronic device) which receives this transmission, may be used to interpret the voltage readings to determine a button 116 state. Other methods, devices, or structures, now known or later developed, which allow the RF transponder 528 to determine a button's 116 state may be used as well. Such methods, devices, or structures are known in the art of push and other buttons and are not described extensively herein so as to avoid obscuring the invention. For example, a button 116 may have a contact switch or potentiometer connected to its RF transponder 528.

It is contemplated that in some embodiments the RF transponder 528 may provide button identification information such as, but not limited to, a code or serial number, which the transponder may transmit alone or along with a button state. The button identification information may be a code, serial number, or the like used to identify a particular type of button 116, identify individual buttons from a group, or both along with the button's state. This is advantageous in that an electronic device may associate one or more of its functions with a particular type of button and may execute associated functions in response to changes in button state for a type of button regardless of where the button 116 (or buttons) have been positioned or repositioned.

The RF transponder 528 may also transmit button authentication information. Generally, button authentication information is information, such as but not limited to a code or key, that may be used to electronically sign one or more buttons 116 to ensure and verify the buttons are authorized for use with a particular electronic device or a group of electronic devices. For example, each button 116 or a group of buttons may be electronically signed such as through a public key encryption system such that each button's RF transponder 528 has an electronic signature created with a public key which may be used to verify its authenticity with one or more private keys. Public key encryption is well known and is not extensively described herein so as to not obscure the invention. It is contemplated that other electronic authentication schemes, now known or later developed, may be used as well.

The ability to verify authenticity of buttons is advantageous in that it prevents buttons from being tampered with and it prevents use of unauthorized buttons. For example, it is desirable that buttons in ATMs or gaming machines be authentic such as to prevent stealing of PIN numbers, cheating, or the like.

In one or more embodiments, the RF transponder 528 may be configured to transmit an encrypted signal or encrypted information. For example, button states may be encrypted so as to prevent such information to be wirelessly intercepted. In this manner, the invention may be used to input passwords, PIN numbers, and the like securely. It is contemplated that a public key encryption system or other encryption now known or later developed may be used to encrypt transmitted signals and information.

Furthermore, it is contemplated that the RF transponders 528 may be used to identify the position of one or more individual buttons 116 attached to the invention. In this manner, an electronic device may automatically position labels 112 under each button 116 even when the button is moved to a new location. This is yet another advantage of the invention because electronic devices may automatically configure themselves to various button positions by detecting new button positions and displaying labels 112 accordingly. The correct label for a particular button 116 or group of buttons can be determined in various ways such as, but not limited to, determining a button's label 112 based on its type or unique identifier transmitted by each button's RF transponder 528.

As indicated, the buttons 116 may have a variety of configurations. In one embodiment, the button 116 is a push-type button having a user-engageable plunger 504 which is movable between a first position and a second position. Of course, the button may be configured to have multiple states (such as three or more positions), and may operate in other modes. For example, instead of moving vertically in "push-button" format, a portion of the button might rotate, translate (like a slider) or the like.

Figure 6A:
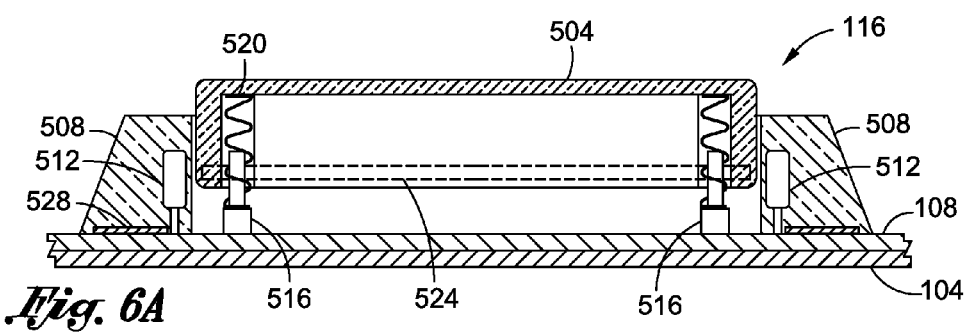
FIGS. 6A-6B are cross section side views of a button in different states according to an embodiment of the invention.
Figure 6B:
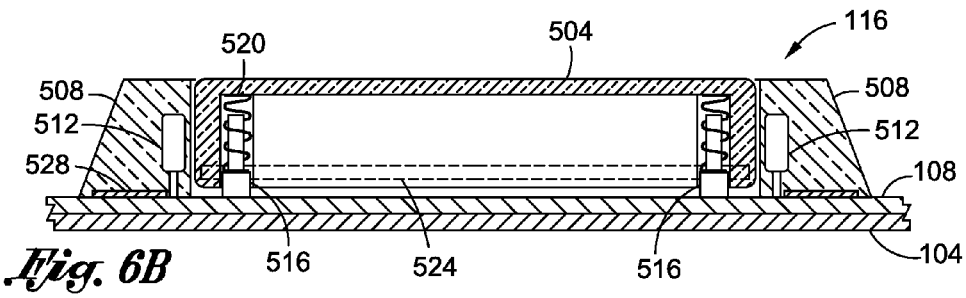

FIGS. 6A-6B illustrate two possible states of a push-type button 116 in accordance with one embodiment of the invention. FIG. 6A illustrates the button 116 in an unpressed or unactivated state (as detailed below, in this state the plunger 504 may be biased upwardly). This position may be detectable because of the position of the magnetic ring 524 relative to the Hall effect sensors 512. FIG. 6B illustrates the button 116 is in a pressed or activated state (wherein the plunger 504 is moved downwardly by the user). It can be seen in these figures that the position of the magnetic ring 524 changes relative to the Hall effect sensors 512 as the button is pressed. Thus, the state (e.g. unpressed, pressed, or being pressed) of a button 116 may be detected and ultimately transmitted to the RF board 104 by a passive RF transducer 528.

As indicated, the button or other input device (switch, knob, slider, etc.) may include one or more RF transponders 528 as described above to transmit their respective states to the RF board 104. For example, if used with a switch, the transponder may transmit whether the switch is in an on, off, or other position. If used with a knob, the transponder may transmit if the knob is being turned, in what direction, and to what extent.

User input may be detected in other manners than the embodiment just described. For example, other means now known or later developed may be utilized to passively detect the condition of the button and/or indicate the condition of a button wirelessly. For example, a button may be configured with a wireless transmitter and a switch, wherein the condition of the switch (activated or not) may be reported wirelessly (such as via a signal to a receiver of the associated electronic device) by the transmitter. Preferably, the condition of the button is reported or detected without wires or the like which would interfere with the display screen.

It is possible for the button 116 to be used with a display screen configured as a touch screen. For example, a touch screen 404 in the form of a transparent overlay may be placed over the display screen 108. Of course, the display screen 108 may include touch capability in some embodiments and thus a separate touch screen 404 will not be required in these embodiments.

In this configuration, a user may provide directed input to the touch screen 404 in areas outside the button, and provide button input directly to the buttons. This is advantageous in that it allows further input options. For example, common inputs may be received via the buttons 116 (such as "start" game, "wager" etc.), while certain infrequent game-specific inputs (such as bonus event inputs, where the bonus events occur infrequently such that it would not be beneficial to provide a great number of buttons for those inputs) may be provided directly to the touch screen 404. In addition, the touch screen 404 can enable drag and drop functionality or multi-touch capabilities. Thus, an electronic device can provide both touch screen input and the physical input, as described above, with a single embodiment of the invention.

One advantage of the invention is that the buttons 116 can be used with an existing display. For example, a gaming machine typically includes one or more display screens for displaying game information, player-related information or the like. In accordance with the invention, one or more buttons 116 can be associated with these one or more existing display screens (thus eliminating the need for additional screens to implement the invention). In addition, in this configuration, one portion of a display screen can be used to display information such as game information, while other portions of the screen may label or identify the buttons 116. An advantage of this configuration is that the buttons 116 can be located close to the other information. For example, a user may be required to provide input during play of a game. In accordance with the invention, the game information may be displayed via the display screen with the one or more buttons 116 located in very close proximity thereto, reducing the need for a player to divert their attention from the display screen to another area to locate a button or other input, as is the case with current gaming and similar devices. It is noted that that the one or more buttons can be associated with display screens of different sizes, including relatively small displays for use just with a button, or very large displays configured to display additional information.

Figure 7A:
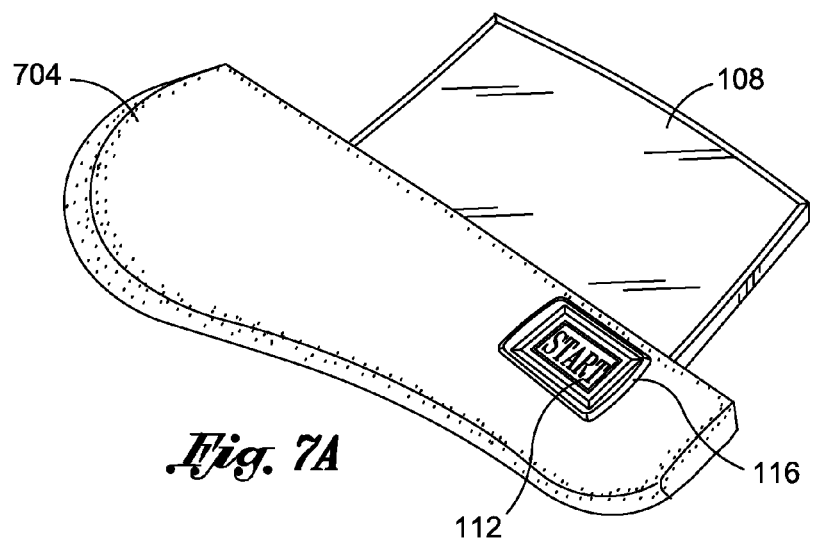
FIGS. 7A-B are perspective views of the various embodiment of the invention installed in electronic devices.
Figure 7B:
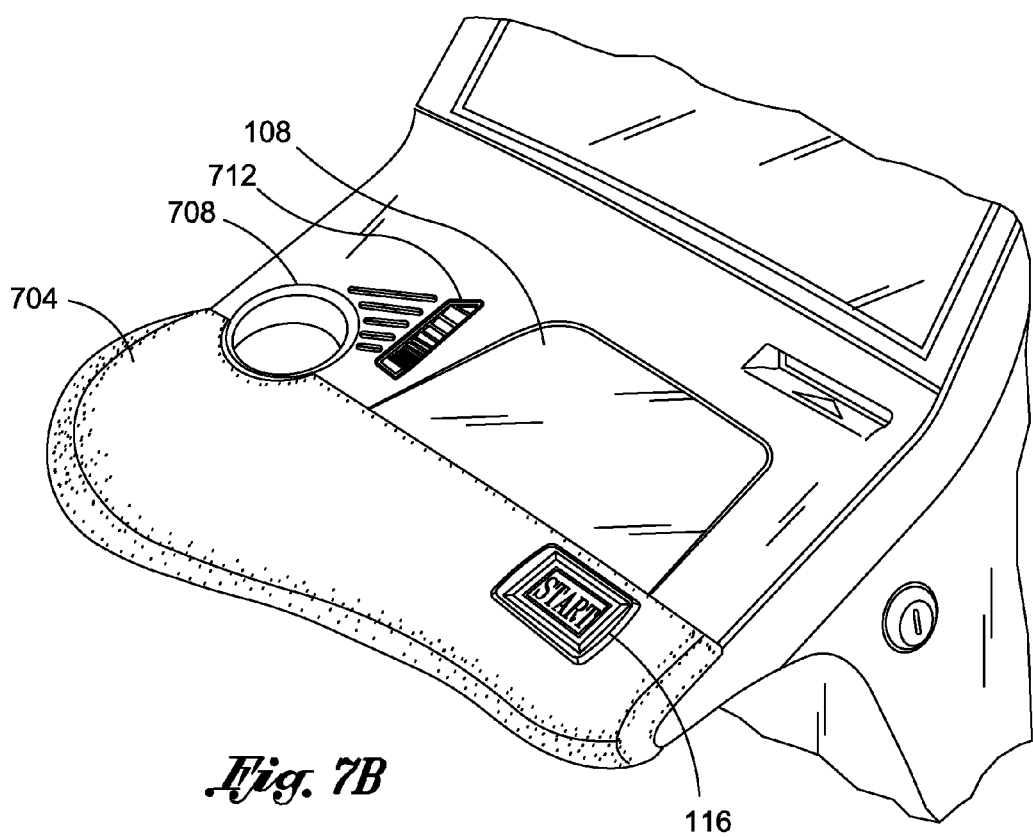

As another aspect of the invention, one or more portions of the display screen with which the one or more buttons are associated can be obscured or partially obscured. FIGS. 7A-7B illustrate application of the invention with an electronic device such as a gaming machine or kiosk. As shown, an opaque overlay 704 with one or more openings for one or more buttons 116 may be used to cover a portion of the display screen 108. In this manner, physical buttons 116 according to the invention are provided, while the uncovered portion of the display screen is used to display information, collect touch input, or both. Of course, the opaque overlay 704 may be used with non-touch enabled embodiments of the invention.

Various advantages can be appreciated from the configuration illustrated in FIGS. 7A-7B. For example, relative to gaming machine or kiosk, instead of using one or more standard buttons, a "START" button 116 (or other buttons) of these devices is a button according to the invention. Thus, electronic devices using the invention remain intuitive to users because, as shown in the figures, the invention can be installed within a device such that it appears similar to typical devices. In addition, the invention allows the button label to be changed as desired, such as to reconfigure the gaming device to present a different game, or so that a kiosk can be used for a different purpose. Thus, for example, the label could change to "STOP", "CASH OUT" in the case of a gaming machine, "ENTER" in the case of an ATM or kiosk, or any other text, graphic, video, or animation.

Furthermore, if, a label (such as "START") is no longer desired or appropriate, the button's 116 label 112 may be easily changed (such as to "GO", "BEGIN", "LOGIN", or any other text, graphic, video, or animation) without physically modifying the electronic device or any component thereof. It can thus be appreciated that the one or more buttons 116 associated with a large number of electronic devices may be easily reconfigured. In fact, it is contemplated that buttons 116 may be configured and reconfigured remotely, such as through a network, which is highly advantageous where a plurality of similar electronic devices need to be configured or updated.

The opaque overlay 704 may be configured to cover an edge, side, or the entire border of the display screen 108 or to cover a portion of the interior or middle of the display screen. As stated, the buttons 116 are wireless and thus may be placed anywhere on the display screen 108 within or outside the opaque overlay 704. In addition, the opaque overlay 704 may be configured to partially or completely surround one or more buttons 116.

It is contemplated that an opaque overlay 704 or a portion thereof may be configured to as an arm rest, a wrist rest, or as a place a user may place or rest his or her hands or other body parts while using the electronic device. The opaque overlay 704 has the advantage of allowing an electronic device using the invention to appear similar to a traditional device while allowing the advantages of the buttons 116 and labels 112 described herein. It is contemplated that the opaque overlay 704 may be used to hold one or more buttons 116, rather than or in addition to attaching the buttons to the display screen 108, if desired. Of course, an opaque overlay 704 may not be provided in some embodiments as the buttons 116 may stand alone.

As shown in FIG. 7B, an electronic device may have other buttons 712 (not associated with a display screen) or features such as a drink holder 708. It is contemplated that these other buttons 712 or features may include RF transponders capable of transmitting state information to the RF board of the invention. For example, the other buttons 712 may transmit whether they are pressed or unpressed, and the drink holder 708 may transmit whether or not a drink is present. This is advantageous in that an electronic device may collect various forms of input besides the input collected by the buttons 116 or touch screen of the invention. It is noted that because the RF board receives state information wirelessly, the other buttons 712 (or features) of electronic devices do not have to be placed on the display screen 108 of the invention as long as they remain within wireless range of the RF board.

Additional detail regarding one embodiment of the present invention will now be provided relative to the figures. Referring first to FIG. 1, FIG. 1 illustrates an embodiment of the invention comprised of a RF board 104 having an interface 120, a display screen 108, and buttons 116. As shown, the RF board 104 is behind the display screen 108 (i.e. at the opposing side of the display from the buttons 116, so as to not interfere with viewing of the display screen) to allow radio frequency energy to be transmitted to and received from one or more buttons 116 attached to the screen. It is contemplated that the RF board 104 may be configured to provide an underlying structure to which the other components, such as the display screen 108, of the invention may be attached in some embodiments.

Figure 2:
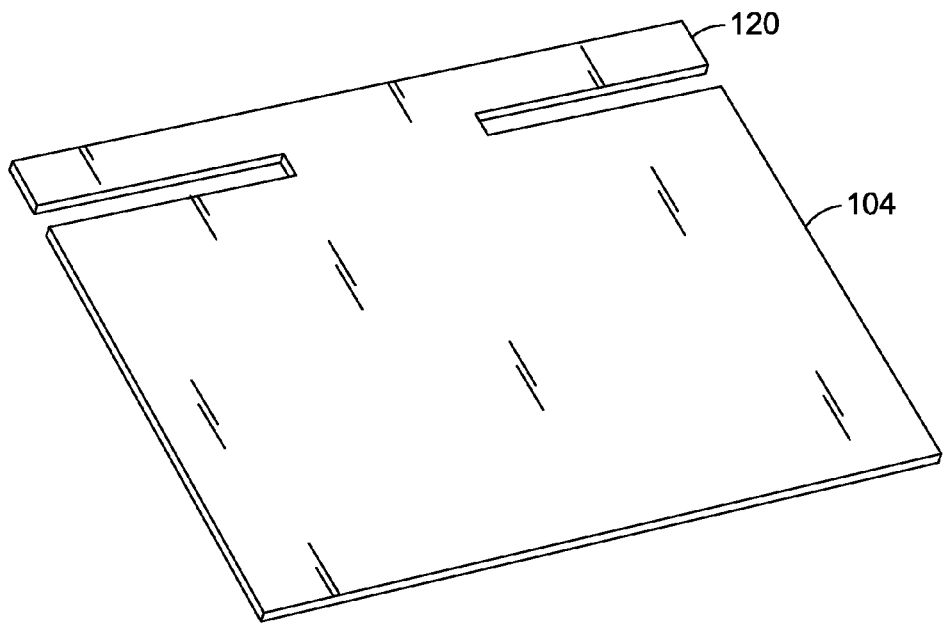
FIG. 2 is a perspective view of an RF board according to an embodiment of the invention.

FIG. 2 illustrates an RF board 104 that may be used with one or more embodiments of the invention. As can be seen, the RF board 104 is configured to provide a surface large enough that radio frequency energy can be emitted and received from buttons 116 placed on the display screen 108. Typically this radio frequency receiving and transmitting surface will comprise one or more antenna and be approximately the same size as the display screen 108 to allow buttons 116 to be placed anywhere thereon. Of course, it is contemplated that some embodiments of the RF board 104 may have longer range and thus may be relatively small compared to the display screen 108. The antenna will typically by configured as a dipole or loop antenna; however, any antenna configuration capable of performing the functions herein may be used. It is also noted that multiple RF boards could be associated with a single display. For example, relative to a very large display, RF boards could be positioned at opposing ends of the display where buttons are also located. In another embodiment, small RF boards might be provided relative to each button.

Figure 3:
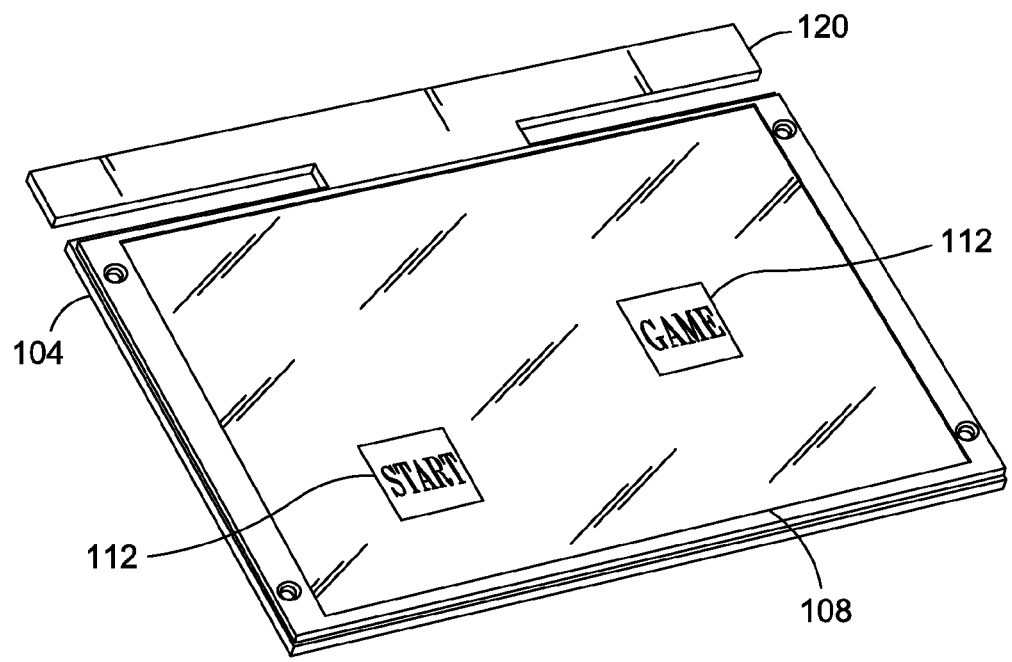
FIG. 3 is a perspective view of a display screen and RF board according to an embodiment of the invention.
Figure 4:
FIG. 4 is a side view of an embodiment of the invention having a touch screen.

As shown in FIG. 3, a display screen 108 may be located above the RF board 104 in one or more embodiments. In addition, as shown in FIG. 4, an optional touch screen 404 may be on top of the display screen 108. Of course, in touch screen 404 embodiments, the one or more buttons would be associated with the touch screen rather than the display screen 108

FIG. 5 illustrates an embodiment of a button 116 according to the invention. The button 116 comprises a casing or main body 508 and a user engageable plunger 504. One or more springs 520 (or other biasing elements or means for biasing) may be used to bias or return the plunger 504 back to a first or unpressed position from a second or depressed position. In one embodiment, at least the plunger 504 or a portion thereof is transparent to allow a label 112 displayed on the display screen 108 to be visible there through. Of course, the casing 508 or a portion thereof may also be transparent in one or more embodiments.

The casing 508 may be configured to hold or support various components of the button 116 therein. For example, the casing 508 may hold one or more Hall effect sensors 512 or one or more passive RF transducers 528. Typically, the Hall effect sensors 512 will be positioned such that they are near the plunger 504. In this manner, the Hall effect sensors 512 can more easily detect changes in voltage caused by movement of a magnetic ring 524 attached to the plunger 504 when the plunger is actuated. Similarly, though not necessary in all embodiments because of the range of the RF board 104, a passive RF transducer 528 will typically be positioned such that it is near the RF board. In this manner, the RF transducer 528 can more easily transmit and receive radio frequency energy or signals to and from the RF board 104.

FIGS. 6A-6B show a cross section view of the button 116. As shown, the button 116 is in an unpressed state in FIG. 6A and in a pressed stated in FIG. 6B. The button's 116 springs 520 are held in place by guide pins 516 which allow the springs to collapse and expand, as the button is pressed and released, respectively. In one embodiment, the springs 520 and the casing 508 guide the plunger 504 as it is pressed and released.

It can also be seen from FIGS. 6A-6B that the magnetic ring 524 changes its position relative to the Hall effect sensors 512 as the plunger 504 is moved. As stated above, this allows the Hall effect sensors 512 to determine the state of the button 116. It is noted that the magnetic ring 524, shown as a ring of magnetic or magnetized material, may come in various configurations. For example, the magnetic ring 524 may only run along a portion of the plunger 504. In addition, magnets or magnetized materials of various shapes and sizes may be used with the button 116 herein as long as their position or movement is detectable by the one or more Hall effect sensors 512. For example, a small rectangular or other shaped magnet may be attached to or integrated into the plunger 504 near the one or more Hall effect sensors 512. Though described as various specific embodiments, it is contemplated that buttons having Hall effect sensors may be configured in any way which allows the sensors to effectively detect one or more button states.

The shape and size of the buttons may vary, as may the display screen with which the one or more buttons are associated.

The invention has particular utility to gaming devices, but has utility in a wide range of applications. Such a device, such as a gaming machine, may include more than one display screen. One or more of such display screens may be configured with one or more buttons as detailed herein.

Relative to a gaming device, one or more buttons might be associated with a main game display. In other embodiments, one or more buttons might be associated with a secondary display, such as a player input display (separate from the main game display). Such a display might be located at a console portion of the gaming machine where normal push-buttons might otherwise be located.

As indicated herein, the invention has numerous advantages. First, a button is associated with a display. In this manner, information displayed by the display may be associated with the button. In one embodiment, the information may be visible through the button or may be visible in close proximity to the button. As indicated, this aspect of the invention permits information associated with a button, such as labeling, to be easily changed or customized. This has particular advantages because it permits a device to have multiple configurations and uses, instead of having to custom create multiple different devices for those different purposes.

Second, the invention has the advantage of providing the user both with clear information about the button, but tactile information regarding their input. In particular, a user can be presented with customized button information. At the same time, unlike with a touch screen or the like, when the user engages the button to provide an input, the button provides tactile feedback. This allows the user to ensure that they have made the desired input.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A reconfigurable electronically labeled button configured to provide player input to an electronic gaming machine which is configured to present at least one game to a player, comprising:
   an electronic display screen configured to display one or more labels on a portion of the display screen, the display screen comprising a video display having an associated touch screen configured to receive input by contact with said touch screen; and
   a push-button configured to receive input from said player, said push-button comprising:
      a pressable plunger disposed over the portion of the display screen displaying the one or more labels, the pressable plunger having at least one transparent portion to allow said one or more labels displayed by said electronic display screen thereunder to be visible there through to said player; and
      a casing movably supporting said pressable plunger, said casing extending around at least a portion of said pressable plunger and supporting movement of said plunger from a first state to a second state,
   wherein said plunger is movable between said first and second states by input of said player to said pressable plunger and
   wherein button state information is determined based on the position of said pressable plunger.

2. The electronically labeled button of claim 1 wherein said casing is attached to said electronic display screen without piercing or physically modifying said electronic display screen.

3. The electronically labeled button of claim 1 wherein said first state of said pressable plunger comprises a raised position and said second state comprises a depressed position, and wherein an input signal to said gaming machine is generated when said pressable plunger is moved from said raised position to said depressed position by input by said player.

4. The electronically labeled button of claim 1 further comprising:
   an RF board configured to transmit and receive radio frequency signals, the RF board attached behind the electronic display screen;
   an RF transponder disposed within the casing;
   magnetic material attached to said pressable plunger; and
   one or more Hall effect sensors held by said casing;
   wherein said button state information is detected by said one or more Hall effect sensors.

5. The electronically labeled button of claim 4 wherein said magnetic material is a magnetic ring attached to said pressable plunger.

6. The electronically labeled button of claim 1 further comprising one or more opaque overlays attached on top of said display screen and configured to at least partially surround said electronically labeled button.

7. The electronically labeled button of claim 1 wherein at least a portion of said casing is transparent.

8. The electronically labeled button of claim 4 wherein said RF transponder is powered by said radio frequency signals transmitted by said RF board.

9. The electronically labeled button of claim 4 wherein said RF transponder is configured to transmit button identification information or button authentication information.

10. The electronically labeled button of claim 1 wherein the pressable plunger and the casing are associated with the touch screen.

11. The electronically labeled button of claim 1 wherein said one or more labels comprise text, graphics, animation, or video.

12. The electronically labeled button of claim 1, wherein the electronic display screen extends beyond the casing in at least one direction.

13. The electronically labeled button of claim 1, comprising a first push-button and a second push-button associated with said electronic display screen, a first pressable plunger of said first push-button disposed over a first portion of said display screen and a second pressable plunger of said second push-button disposed over a second portion of said display screen.

14. The electronically labeled button of claim 13, wherein said first portion of said display screen displays a first label visible through said first pres sable plunger and said second portion of said display screen displays a second label visible through said second pressable plunger.

* * * * *